(12) United States Patent
Itoh

(10) Patent No.: US 9,135,487 B2
(45) Date of Patent: Sep. 15, 2015

(54) SAMPLE INFORMATION DETECTION APPARATUS AND SAMPLE INFORMATION DETECTION METHOD

(71) Applicant: AOI SEIKI CO., LTD., Kumamoto-shi, Kumamoto-ken (JP)

(72) Inventor: Teruaki Itoh, Kumamoto (JP)

(73) Assignee: AOI SEIKI CO., LTD., Kumamoto-Shi, Kumamoto-Ken (JP)

( * ) Notice: Subject to any disclaimer, the term of this patent is extended or adjusted under 35 U.S.C. 154(b) by 0 days.

(21) Appl. No.: 13/733,427

(22) Filed: Jan. 3, 2013

(65) Prior Publication Data

US 2013/0175342 A1    Jul. 11, 2013

(30) Foreign Application Priority Data

Jan. 5, 2012    (JP) ................................ 2012-000544

(51) Int. Cl.
    *G06K 7/10*    (2006.01)

(52) U.S. Cl.
    CPC .............. *G06K 7/10871* (2013.01); *G06K 7/10* (2013.01); *G06K 7/1092* (2013.01); *G06K 7/10831* (2013.01)

(58) Field of Classification Search
    CPC . G06K 7/14; G06K 7/10861; G06K 7/10871; G06K 7/10831; G06K 7/1092; G06K 7/10
    USPC ............. 235/462.01, 462.14, 462.32, 462.37, 235/479
    See application file for complete search history.

(56) References Cited

U.S. PATENT DOCUMENTS

| | | | |
|---|---|---|---|
| 4,825,068 A * | 4/1989 | Suzuki et al. ............. | 250/223 R |
| 5,770,848 A * | 6/1998 | Oizumi et al. ............ | 235/462.14 |
| 6,330,973 B1 * | 12/2001 | Bridgelall et al. ....... | 235/462.45 |
| 6,588,669 B1 * | 7/2003 | Claus et al. ................ | 235/462.4 |
| 6,752,318 B2 * | 6/2004 | Ishii .............................. | 235/470 |
| 7,579,582 B2 * | 8/2009 | Kaltenbach et al. .......... | 250/234 |
| 2012/0018519 A1 | 1/2012 | McGarry | |
| 2012/0181519 A1 * | 7/2012 | Lee et al. ........................ | 257/40 |

FOREIGN PATENT DOCUMENTS

| | | |
|---|---|---|
| CN | 101726612 | 6/2010 |
| JP | 8-77289 | 3/1996 |
| JP | 2000-283824 | 10/2000 |
| JP | 2005-310050 | 11/2005 |
| KR | 10-2009-0114487 | 11/2009 |
| TW | 594589 | 6/2004 |
| WO | WO 2011/085362 A1 | 7/2011 |

OTHER PUBLICATIONS

European Search Report in EP 13 00 0004 dated Jun. 21, 2013.
Taiwanese Office Action dated Jul. 25, 2014 issued in Taiwanese Patent Application No. 101149795 and English Translation, 8 pp.
Canadian Office Action dated Jul. 10, 2015 issued in Canadian Patent Application No. 2,800,598, 4 pp.

* cited by examiner

*Primary Examiner* — Paultep Savusdiphol
(74) *Attorney, Agent, or Firm* — Nixon & Vanderhye P.C.

(57) ABSTRACT

According to an embodiment, a sample information detection apparatus includes, a reflection unit includes a reflection mirror configured to reflect an image of a sample container configured to contain a sample, an image acquisition unit includes an imaging unit configured to image an imaging range covering images reflected by the reflection mirror, the image acquisition unit being configured to acquire the image of the sample container that is reflected by the reflection mirror, and a sample information detection unit configured to detect information displayed on a side portion of the sample container based on the acquired image.

4 Claims, 3 Drawing Sheets

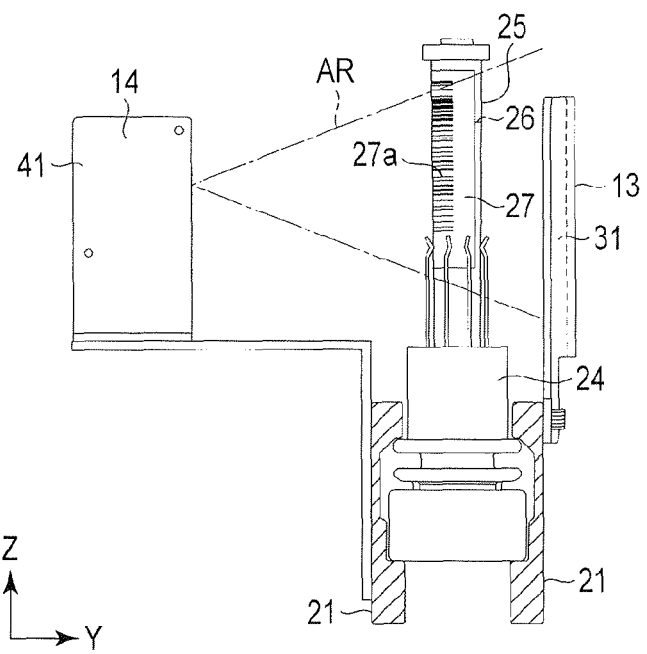
F I G. 2
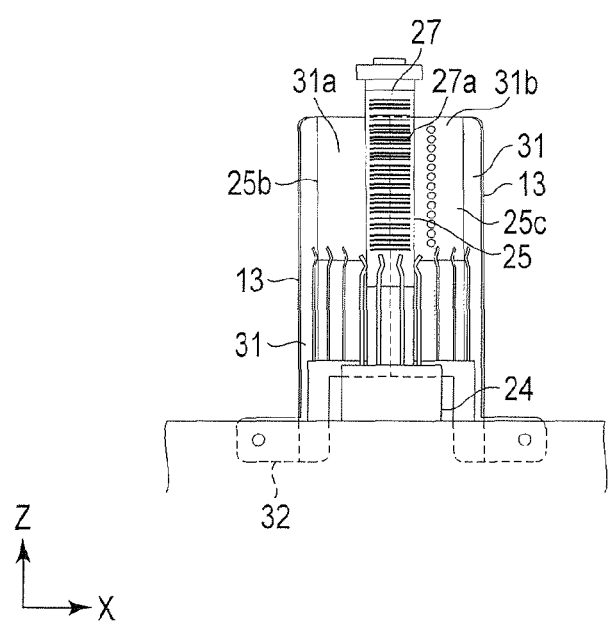
F I G. 3

SAMPLE INFORMATION DETECTION APPARATUS AND SAMPLE INFORMATION DETECTION METHOD

CROSS-REFERENCE TO RELATED APPLICATIONS

This application is based upon and claims the benefit of priority from prior Japanese Patent Application No. 2012-000544, filed Jan. 5, 2012, the entire contents of which are incorporated herein by reference.

BACKGROUND OF THE INVENTION

1. Field of the Invention

Embodiment described herein relates to a sample information detection apparatus and a sample information detection method.

2. Description of the Related Art

During processing of samples, for example, where samples such as blood and serum are tested and analyzed, an operation of reading sample information from a barcode or the like attached to a test tube (sample container) is performed as disclosed in Jpn. Pat. Appln. KOKAI Publication No. 2005-310050. Information of a barcode, etc. is often provided on a portion of the side face of a test tube, rendering it difficult to perform the operation depending on the positional relationship of the barcode, etc. to a read unit. Accordingly, rotating a test tube to adjust its orientation during or prior to a read operation has been practiced. For example, it has been a practice to use a laser read apparatus to scan a test tube while rotating the test tube.

The rotational adjustment of orientations requires a long time, thus hampers improvement in processing efficiency.

BRIEF SUMMARY OF THE INVENTION

According to an embodiment, a sample information detection apparatus comprises, a reflection unit comprising a reflection mirror configured to reflect an image of a sample container configured to contain a sample, an image acquisition unit comprising an imaging unit configured to image an imaging range covering images reflected by the reflection mirror, the image acquisition unit being configured to acquire the image of the sample container that is reflected by the reflection mirror, and a sample information detection unit configured to detect information displayed on a side portion of the sample container based on the acquired image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a side view of the barcode read apparatus according to the embodiment.

FIG. 3 is a front view of the barcode read apparatus according to the embodiment.

DETAILED DESCRIPTION OF THE INVENTION

First Embodiment

A barcode read apparatus (sample information detection apparatus) 10 according to one embodiment will be described with reference to FIGS. 1 to 4. Structures in each figure are schematically shown with size enlargement, size reduction or omission as appropriate. Arrows X, Y and Z in the figures represent three directions orthogonal to each other.

Figure 1:
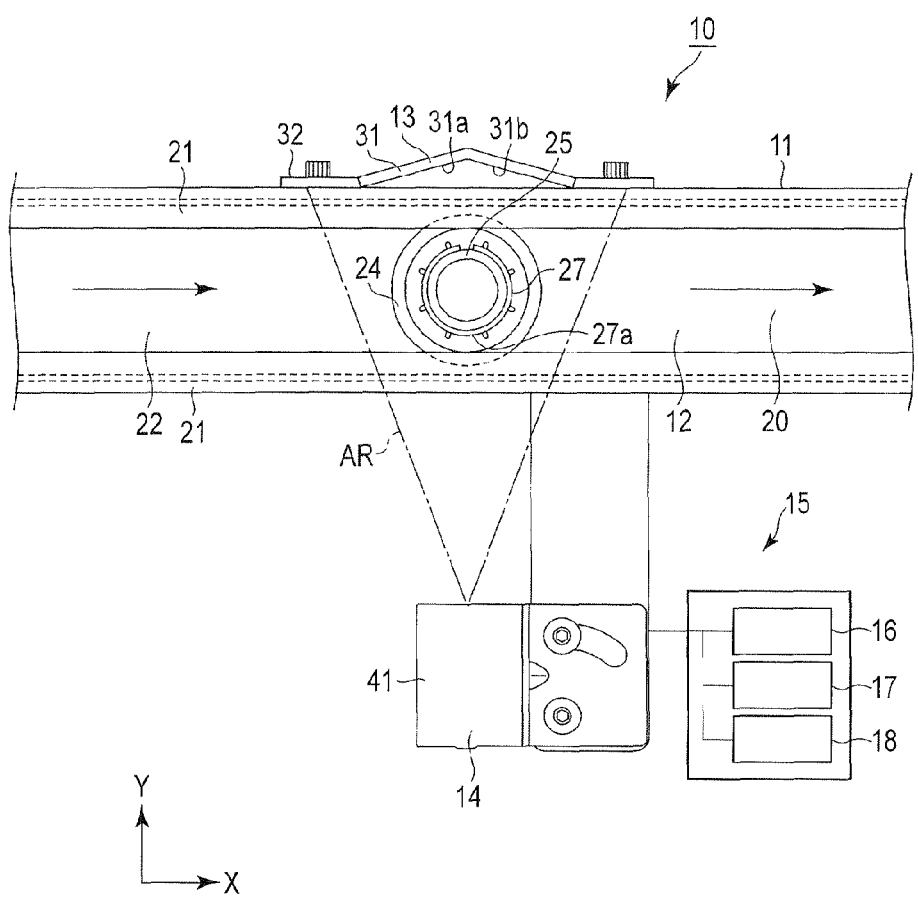
FIG. 1 is a plan view of a barcode read apparatus according to a first embodiment.

FIGS. 1 to 3 illustrate the barcode read apparatus 10 according to the embodiment. The barcode read apparatus 10 is a processing apparatus which reads sample information such as identification information of a sample in advance of a variety of test processes, and which is employed as, for example, one of pre-treatment apparatuses of an analysis apparatus.

The barcode read apparatus 10 comprises an apparatus body 11, a conveyer unit 12 which conveys a test tube (sample container) 25 such as a blood collecting tube along a predetermined conveyer path 20, a reflection unit 13 which reflects an image of the test tube 25, an image acquisition unit 14 which acquires image information (images) by imaging, and an information detection unit 15 which acquires information of the test tube 25 or a sample based on the acquired image information.

The conveyer unit 12 is a holder conveying mechanism of a conveyer type, which is provided at an upper portion of the apparatus body 11. The conveyer unit 12 comprises a pair of guide rails 21 along the predetermined conveyer path 20, a conveyer belt 22 which moves with a holder 24 placed thereon, a motor which drives the conveyer belt 22, and the like.

Between the pair of guide rails 21, the holder 24 holding the test tube 25 is conveyed as the conveyer belt 22 moves. Along the conveyer path 20, processing apparatuses for performing a variety of processes on a sample 26 or the sample container 25 are disposed one after another at predetermined positions on the upstream side or the downstream side.

The test tube 25 is made of, for example, transparent glass and has a cylindrical shape within which a cylindrical space is formed to accommodate the sample. The test tube 25 is supported by the holder 24 and conveyed in a standing state. A label 27 is attached to the outer peripheral side face of the test tube 25. The label 27 displays, for example, a barcode 27a as an information indicating portion which is indicative of a variety of sample information, such as the identification information of the sample 26. The barcode 27a is present across the range of, for example, about ⅙ of the total circumferential perimeter in the outer peripheral face of the test tube 25 (i.e. the range forming a central angle of 60°).

The reflection unit 13 comprises a V-shaped reflection mirror 31 which includes a first reflection face 31a and a second reflection face 31b, and a support unit 32 for fixing the reflection mirror 31 to a side portion of the conveyer path 20. Both the first reflection face 31a and the second reflection face 31b are arranged to face the imaging unit 41. An angle between the first reflection face 31a and the second reflection face 31b is set such that images of the test tube 25 in all directions can be acquired from the front. In this embodiment, the first reflection face 31a and the second reflection face 31b are disposed in, for example, a V-shaped arrangement forming an angle of 150° with respect to each other. The first reflection face 31a is disposed on the upstream side in the conveyance direction with an inclination of, for example, 15° with respect to the conveyer path 20, and arranged to reflect an image 25b of the back face of the test tube 25 on the upstream side (i.e. the starting side of the X direction). The second reflection face 31b is disposed on the downstream side in the conveyance direction with an inclination of, for example, −15° with respect to the conveyer path 20, and arranged to reflect an image 25c of the back face of the test tube 25 on the downstream side (i.e. the ending side of the X direction).

The image acquisition unit 14 comprises an imaging unit 41 which images a predetermined imaging range. The imaging unit 41 comprises a color CCD camera and is disposed on the other side portion of the conveyer path 20. The reflection mirror 31 is disposed on the back side (one side) of the test tube 25, and the imaging unit 41 is disposed on the front side (the other side) of the test tube 25.

The imaging unit 41 images an imaging range AR covering the first reflection face 31a and the second reflection face 31b, from the front of the test tube 25 held in a standing state at an imaging point. Whereby, the imaging unit 41 acquires color image data of the imaging range AR. The acquired image data is stored in a storage unit 16 and forwarded to a data processing unit 17.

Figure 4:
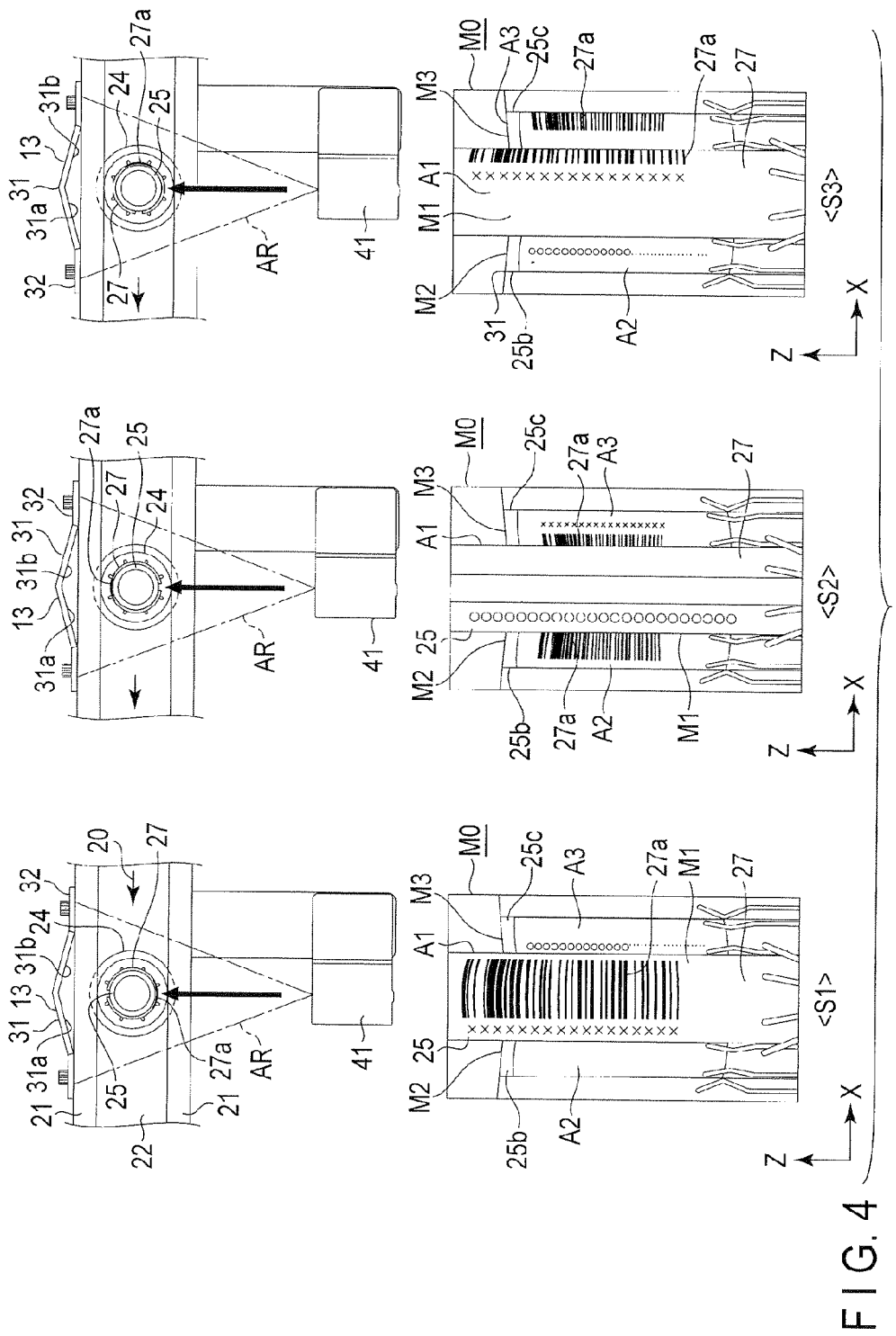
FIG. 4 illustrates a barcode read method according to the embodiment.

Within the imaging range AR, the test tube 25 is present at the front center, the first reflection face 31a of the reflection mirror 31 is present on the rear left side of the test tube 25, and the second reflection face 31b of the reflection mirror 31 is present on the rear right side of the test tube 25. As shown in FIG. 4, an image M0 acquired by imaging the imaging range AR using the imaging unit 41 may exhibit three images side by side, namely, an image M1 of the side portion of the test tube 25 that can be seen from the front when viewed from the imaging unit 41, and a left back face image M2 and a right back face image M3 of the test tube 25 reflected by the reflection mirror 31 on the back side.

The information detection unit 15 comprises the image acquisition unit 14, as well as the storage unit (storing means) 16 which stores a variety of data including the image data, the data processing unit 17 which performs data processing including the image processing based on the variety of data, and a control unit (controlling means) 18 which controls operations of each unit.

A barcode read method according to the embodiment will be described with reference to FIG. 4. FIG. 4 illustrates correspondence between images and orientations, and shows a first state S1 in which the barcode 27a faces the imaging unit 41, a second state S2 in which the barcode 27a faces in the direction opposite to the imaging unit 41, and a third state S3 in which the barcode 27a is oriented sideward with respect to the imaging unit 41.

The control unit 18 first controls the image acquisition unit 14 to perform imaging. At the time of imaging, the rest tube 25 is illuminated with light from the front, and the imaging unit 41 images the test tube 25 in a standing state from the front. Whereby, the image data of the image M0 may be acquired, including not only the front image M1 as a front image of the test tube 25 but also the two back images M2 and M3 as left and right back images of the test tube 25 reflected by the reflection mirror 31 disposed on the back side.

In other words, the image M0 has three areas, namely, a central area A1, a left area A2 and a right area A3 which exhibit the three respective images of the front image M1, the left back image M2 and the right back image M3. As such, the single image M0 may cover image information of every side face, throughout the all directions of 360°. Accordingly, the image of the barcode 27a may always be shown in one of the three areas A1, A2 and A3.

The control unit 18 controls the storage unit 16 to store the image data of the acquired image M0. Then, as a detection process, the control unit 18 controls the data processing unit 17 to perform image processing based on the image data of the image M0 to detect the identification information indicated by the barcode 27a. At this time, since the barcode 27a is always shown in one of the three areas A1, A2 and A3 in the image M0, or across two or more of these areas, the required barcode information may securely be obtained by the image processing.

As illustrated in FIG. 4, for example, in the first state S1 in which the barcode 27a as a read object faces the imaging unit 41, the barcode 27a is shown in the front image M1 in the central first area A1 of the image M0. In the second state S2 in which the barcode 27a faces in the direction opposite to the imaging unit 41, the barcode 27a is shown in the back image M2 in the second area A2 and the back image M3 in the third area A3; thus, the identification information may be obtained based on the image information of these images. In the third state S3 in which the barcode 27a is oriented sideward with respect to the imaging unit 41, the barcode 27a is shown in a portion of the front image M1 in the first area A1 and a portion of the back image M2 in the left-side second area A2; thus, the identification information may securely be obtained based on the image information of these images.

The barcode read apparatus 10 according to the embodiment may provide various effects. That is, since the reflection unit 13 is disposed on the opposite side of the imaging unit 41, and since the single image M0 acquired by the imaging of the imaging range AR covering the reflection unit 13 contains the images of the test tube 25 from multiple directions, sample information may easily and securely be obtained with a high accuracy. Also, even when the barcode as a read object is not positioned in front of the imaging unit 41, a processing step of adjusting the orientation may be omitted; thus, processing efficiency may greatly be improved.

Moreover, since the imaging is performed without a rotational movement, a CCD camera which is compact and not costly may be employed. That is, CCD cameras have a limited readable distance and often cause read error and underflow during a reading operation on moving objects; thus, CCD cameras have not been suitable for reading moving objects. However, according to the embodiment which eliminates necessity of the movement, application of a CCD camera may be realized.

The embodiment having been described acquires three images of multiple directions in the form of the single image M0, and obtains the identification information by recognizing the barcode 27a from the image information in the predetermined three areas A1 to A3. Therefore, the embodiment may cope with the cases of all directions throughout 360°, without having additional processing steps. For example, the embodiment achieves a nigh processing rate as compared to the form of employing a number of cameras to acquire images from multiple directions and perform processing based on a plurality of image information. Therefore, the embodiment may also realize simplification in apparatus configurations.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A sample information detection apparatus comprising:
a conveyer unit configured to hold a sample container in a standing state and convey the sample container along a predetermined conveyer path, the sample container being configured to contain a sample;
a reflection unit comprising a V-shaped mirror configured to reflect an image of the sample container, the V-shaped mirror including a plurality of reflection faces disposed on one side of the conveyer path along a standing direction of the sample container, the plurality of reflection faces facing a side face of the sample container and inclined with respect to each other;
an image acquisition unit comprising an imaging unit disposed on another side of the conveyer path facing the reflection unit with the sample container interposed between the imaging unit and the reflection unit, the imaging unit being configured to image an imaging range covering images reflected by the reflection unit, the image acquisition unit being configured to acquire the image of the sample container that is reflected by the reflection unit; and
a sample information detection unit configured to detect information displayed on a side portion of the sample container based on the acquired image, wherein
the information is sample information indicated by a barcode attached to the side face of the sample container,
the reflection mirror is disposed on one side of the sample container conveyed in a standing state, the reflection mirror being configured to reflect an image of a side portion of the sample container on the side face,
the imaging unit is disposed on another side of the sample container in alignment with a periphery of the sample container, the imaging range covering another side portion of the sample container on the another side and a reflection face of the reflection mirror,
the image acquisition unit is configured to acquire an image including the image of the side portion of the sample container that is reflected by the reflection mirror and an image of the another side portion of the sample container directly imaged by the imaging unit, by the imaging of the imaging range, and
the sample information detection unit is configured to obtain the sample information based on at least one of the images included in the acquired image.

2. The sample information detection apparatus according to claim 1, wherein the imaging unit comprises a CCD camera,
the acquired image includes a first image of a front of the sample container, a second image of the sample container that is reflected by one of the plurality of reflection faces of the reflection mirror, and a third image of the sample container that is reflected by other one of the plurality of reflection faces of the reflection mirror, and
the sample information detection unit is configured to perform data processing to detect the sample information from image information of at least one of the images included in the acquired image.

3. A sample information detection method, comprising:
imaging with an image acquisition unit including an imaging unit a predetermined imaging range covering a reflection face configured to reflect an image of a sample container and disposed on one side of a conveyer path along a standing direction of the sample container, from a position facing the reflection face on another side of the conveyer path, to acquire an image including the image of the sample container that is reflected by the reflection face, the sample container being configured to contain a sample, the conveyer path being configured to hold and convey the sample container in a standing state; and
detecting with a sample information detection unit information displayed on a side portion of the sample container based on the acquired image, wherein
the information is sample information indicated by a barcode attached to the side portion of the sample container,
the reflection face is disposed on one side of the sample container conveyed in a standing state, the method further comprising reflecting with the reflection face an image of the side portion of the sample container,
the imaging unit is disposed on another side of the sample container with the sample container interposed between the imaging unit and the reflection face and the imaging unit in alignment with a periphery of the sample container, the method further comprising the imaging range covering another side portion of the sample container on the another side and the reflection face,
the image acquisition unit acquiring an image including the image of the side portion of the sample container that is reflected by the reflection face and an image of the another side portion of the sample container that is directly imaged, by the imaging of the imaging range, and
the sample information detection unit obtaining the sample information based on at least one of the images included in the acquired image.

4. The sample information detection method according to claim 3, wherein the imaging unit comprises a CCD camera, and wherein the reflection face comprises a plurality of reflection faces,
the acquired image includes a first image of a front of the sample container, a second image of the sample container that is reflected by one of the plurality of reflection faces, and a third image of the sample container that is reflected by other one of the plurality of reflection faces, and
the sample information detection unit performing data processing to detect the sample information from image information of at least one of the images included in the acquired image.

* * * * *